Oct. 10, 1967    H. A. DIXON    3,346,842

VEHICLE DETECTORS

Original Filed Oct. 9, 1961

*INVENTOR.*
HAROLD A. DIXON

BY

*Edward W. Raums*

ATTORNEY

United States Patent Office 3,346,842
Patented Oct. 10, 1967

3,346,842
VEHICLE DETECTORS
Harold A. Dixon, Bethesda, Md., assignor to Laboratory for Electronics, Inc., Waltham, Mass., a corporation of Delaware
Continuation of abandoned application Ser. No. 143,911, Oct. 9, 1961. This application Apr. 20, 1965, Ser. No. 453,541
14 Claims. (Cl. 340—38)

ABSTRACT OF THE DISCLOSURE

A transistor or Hall effect generator or other semi-conductor, in a casing for mounting in or adjacent a road for actuation by vehicles by variation of conductivity of a semi-conductor by varying compression or relative position of its electrodes in response to pressure or vibration of the road or the casing directly, or through a piezoelectric crystal which vibrates to vary bias, from passage of a vehicle, or by activation of a Hall generator by a magnetic field from an electromagnet energized by a vehicle actuated switch or from a permanent magnet moved by a vehicle, or directly from change of the earth's magnetic field by vehicle passage.

---

This invention relates to vehicle detectors and more particularly relates to semi-conductor devices embedded within or placed adjacent a roadway for detecting passage or other characteristics of vehicles, for actuation by traffic. This application is a continuation of application Ser. No. 143,911 filed Oct. 9, 1961, now abandoned.

Vehicle detectors are known in the art as including pressure switches, magnetic detectors, photoelectric cells, pneumatic switches and others. These switches tend to be large, bulky, expensive and soon become defective due to frequent operation and to the conditions to which they are subjected, as for example, roadway moisture and atmospheric temperature changes. Furthermore, it is expensive to position large detectors within the roadway in addition to their original cost. Also, depressions within the roadway frequently occur subsequent to the embedding of the detector resulting in increased highway maintenance.

Accordingly, it is an object of this invention to provide a small, inexpensive, long-lifed traffic detector which is adapted to be mounted within or adjacent the roadway.

It is another object to provide a semi-conductor traffic detector.

A further object is to provide a traffic detector using a Hall effect semi-conductor device.

Another object is to provide a traffic detector having a piezoelectric crystal affixed to a transistor and subject to vehicle pressure.

A further object is to provide a traffic detector using a transistor embedded within the roadway to provide an output signal in response to the compression of one or more junctions or the movement of one electrode with respect to another.

These and further objects will be apparent to those skilled in the art upon reading the following detailed disclosure of which:

Figure 1:
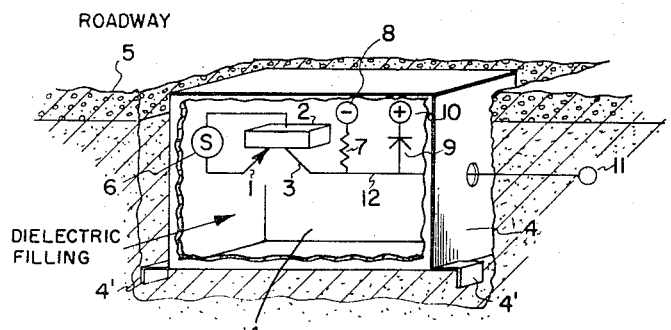
FIG. 1 is a first embodiment of my invention of a transistor embedded within a roadway.

FIG. 1 illustrates a point contact semiconductor having an emitter 1, base 2 and collector 3. The semiconductor is mounted within a housing 4. The housing 4 is preferably a metallic box having a flange at 4' which is adapted to be mounted within the roadway 5. This mounting eliminates the problem of roadway moisture while also providing a means for transmitting the effect of vehicle passage to the semiconductor. The point contact transistor is hermetically sealed within the box such as by rubber or other solid, liquid or gas insulating mediums. While the semiconductor is shown in schematic form it will be obvious that there are numerous ways of mounting the semiconductor in the casing; for example the semiconductor may be completely surrounded by the solid or liquid dielectric 14 or it may be rigidly mounted to one of the walls of the casing.

A source of signals 6 as for example a battery is connected between the emitter and base to bias the transistor slightly in either a forward or reverse direction. This source is preferably variable to set the desired bias voltage for the particular transistor in its operating conditions in the roadway.

The collector 3 is connected through a load resistor 7 to a source of reverse D.C. bias 8; a diode 9 is connected between the collector and a source of positive D.C. voltage 10. The negative source 8 and positive source 10 reverse biases the diode 9 so that it is normally non-conducting.

In the operation of FIG. 1, a vehicle moving along the roadway sets up vibration in the roadway which will cause a non-conducting transistor (reverse biased emitter) to conduct or cause a conducting transistor (forward biased emitter) to cease conducting. As the vehicle passes, the semiconductor will return to its normal conducting or non-conducting state; the output signal from the collector during and after the passage of the vehicle includes random positive and negative pulses which will vary in rate depending upon the speed of the vehicle, type of road and the amount of forward or reverse bias between the emitter and base in addition to other factors. This indicates that the semiconductor has been shocked or otherwise switched to its other conducting state. The explanation for such operation appears to be that the semiconductor is compressed or that the pressure of the point contacts against the base is varied by the vehicle passage.

While both of these types of pulses may be used to indicate the passage of a vehicle, it is generally desirable to provide output pulses of only one polarity. Accordingly, diode 9 serves to clip any positive output pulses thereby providing only negative output pulses at terminal 11 in response to the passage of a vehicle.

Assume that the transistor is normally biased by source 6 in a conducting direction. Current will flow from collector 3 through resistor 7 to source 8 so that the potential on line 12 is more positive than source 8. The positive potential at source 10 is adjusted to be slightly negative with respect to line 12 with the transistor conducting. In this case current will flow from source 8 to source 10 through resistor 7 and clamp 9 thereby clamping the potential at output terminal 11 to substantially the positive potential of source 10. As the vehicle passes over the transistor the transistor current flow varies and will intermittently cut-off and conduct. When the transistor cuts-off, the voltage at line 12 will rise to a negative potential substantially equal to that of source 8 thereby cutting off diode 9 and providing a negative output pulse at terminal 11.

While the casing 4 is shown only in FIG. 1, it is anticipated that the other embodiments of the invention will have a similar casing for the semiconductor.

Figure 2:
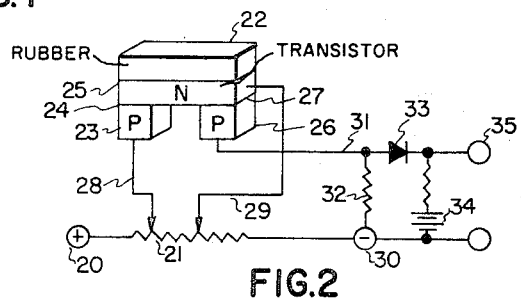
FIG. 2 is a circuit diagram of a second embodiment of my invention utilizing a junction-type transistor.

FIG. 2 illustrates a second embodiment of the invention in which a "junction type" transistor is embedded within the roadway so that a passing vehicle will apply pressure to a junction to vary the current flow therethrough and thereby provide an output signal representing the passage of the vehicle. A bleeder resistor 21 is connected between the positive and negative terminals 20 and 30 respectively of a power supply. A junction transistor is shown mounted within the roadway protected by a rubber covering 22 for example. However, the exact form of mounting the transistor is not a part of this invention and may be mounted within a hermetically sealed casing or other enclosure as desired.

The transistor includes a P type emitter 23 which form an emitter junction at 24 with an N-type base 25; a P-type collector 26 forms a collector junction at 27 with the base. The emitter and base are connected over leads 28 and 29 respectively to taps on bleeder resistor 21. The taps are adjusted to forward bias the emitter with respect to the base; the collector is connected over lead 31 and resistor 32 to terminal 30 which acts as a reverse bias source. Thus the transistor is normally slightly conducting.

As a vehicle rolls over or adjacent the transistor, the emitter base junction will be compressed (the emitter is fixedly attached as for example to the casing to prevent its motion) resulting in more current flow from the collector.

Diode 33 is normally reverse biased by source 30 and battery 34 so that normally in the absence of a vehicle there is no output at terminal 35. However the passage of a vehicle causes the potential on line 31 to increase in a positive direction (due to increased semi-conductor conduction) thereby causing the diode 33 to conduct and pass an output signal to terminal 35. Of course, it will be obvious that the emitter 23 may be forward or reverse biased as discussed in FIG. 1 since the vibrations set up by vehicle passage are oscillatory. Also while the preferred embodiment shows the junction substantially parallel with the roadway other positions of the semi-conductor are possible although less effective and stable.

Figure 3:
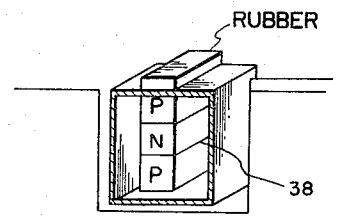
FIG. 3 is a modification of FIG. 2 and shows a junction-type transistor mounted within a roadway.

FIG. 3 illustrates a modification of FIG. 2 in which a junction transistor 38 is shown in its more conventional form and is mounted within a roadway. However, it will be obvious that while the invention is described with reference to two junction devices, it is equally applicable to single junction diodes or to multi-junction devices, as for example the PN-PN trigger device or to a tetrode or pentode type transistor.

Figure 4:
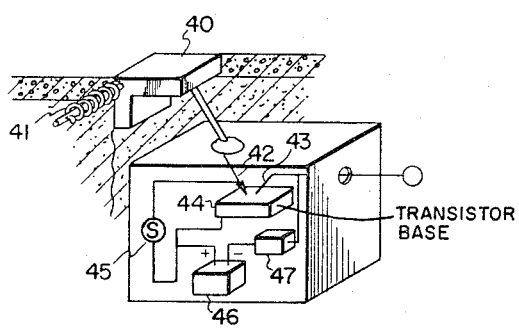
FIG. 4 is a further embodiment of the invention in which one of the electrodes of a transistor is moved with respect to the others in response to vehicle passage.
Figure 4A:
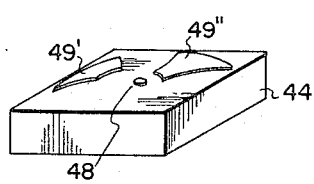
FIG. 4A shows the surface of the transistor partially coated with conductive material so that it can respond to movement determined by vehicle passage.

FIG. 4 illustrates a further embodiment of the invention in which the conductivity of a transistor is varied by moving one of the electrodes with respect to the other electrodes in response to vehicle passage. A treadle or lever bar 40 is positioned within the roadway and normally biased in its position as shown by a spring 41. Connected to the treadle is a point contact emitter electrode 42 such as a stiff tungsten or Phosphor bronze wire. As the treadle is actuated by a vehicle the emitter 42 is moved to the right across the base 44 into closer proximity to the collector 43. A positive forward bias source 45 is connected between the emitter and base and a negative reverse bias battery source 46 is connected to the collector through resistor 47. The bias sources are adjusted so that there will be no conduction (or only slight conduction) when the emitter is in its left hand (non-actuated) position and will conduct substantial current when in its right hand position. The required spacing between the emitter and collector for conduction is quite small so that a careful selection of components to move the emitter is required. While I have shown one method of moving the emitter and collector into a closer relationship upon the passage of a vehicle, it will be obvious to those skilled in the art that other methods are equally feasible. For example as shown in FIG. 4A, the base 44 may be etched or similarly coated with a conductive material at 48 and 49. The collector 43 of FIG. 4 will be permanently fixed at 48. However the conductive material at 49 has two spaced sections 49' and 49" one of which is closer to the collector junction at 48 than the other. Thus when the emitter is in contact with 49' there is substantially no collector current. However, the emitter comes into contact with 49" which is closer to collector junction 48 and collector current flows to indicate vehicle passage.

Figure 5:
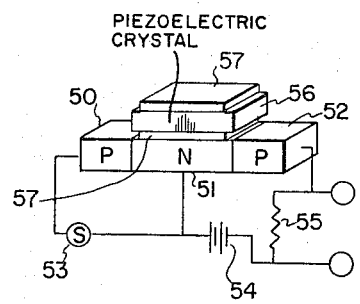
FIG. 5 is a further embodiment of my invention in which a piezoelectric crystal is used to affect the bias of the transistor.

FIG. 5 illustrates a further embodiment of my invention including a PNP junction transistor having emitter 50, base 51 and collector 52 in which a signal source 53 is connected between the emitter and base; this source may either forward or reverse bias the emitter as desired. The collector 52 is reverse biased from source 54 through load resistor 55. A piezoelectric crystal 56 as for example barium titanate is positioned above the base. Such crystals have conductive electrical plates 57 on opposite sides of the crystal; one of these plates is in electrical contact with the semi-conductor base. As a vehicle passes over the roadway, vibrations within the piezoelectric crystal produce alternating electrical charges at the junction of the crystal and base 51. The negative portion of this charge increases the transistor conduction if it was previously conducting or makes it conducting if it was previously non-conducting to provide an electrical output at the terminals shown indicating passage of a vehicle.

Figure 6:
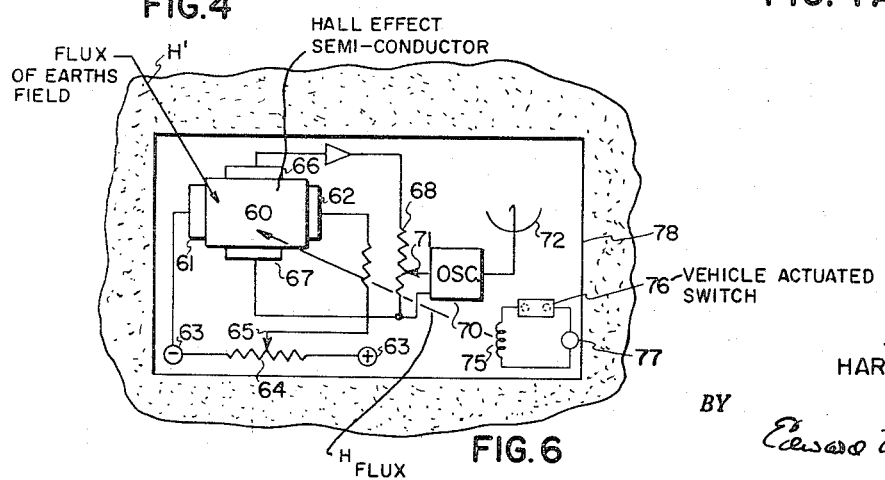
FIG. 6 is a further modification of my invention using a Hall effect generator.

FIG. 6 illustrates another embodiment of my invention using a Hall effect generator for responding to vehicle passage in which the generator is adapted for mounting within a roadway. The generator includes a flat thin plate-like semiconductor crystal material 60 which may be N-type or P-type having a resistivity of 10-ohm-cm. or more. An ohmic connection is made at 61 and 62 to the crystal and battery 63 and potentiometer 64. The battery provides a current flow through the crystal 60 which may be adjusted at 65. Two ohmic output connections are provided at 66 and 67 along the sides of the crystal displaced 90° from the leads 61 and 62. A coil 75 is energized from either an A.C. or D.C. source 77 when a vehicle closes switch 76. All of this apparatus is enclosed in a box 78 embedded in the roadway with the switch 76 in a position to be actuated by vehicles.

As a vehicle passes over the Hall effect generator, a magnetic field H (of the order of 3000 gausses) is induced into Hall plate 60 in a direction perpendicular to the plane joining all four of the electrodes. Thus the magnetic field shifts the direction of current flow from its direct path between 61 and 62 so that current flow is generated between 66 and 67 because of a difference in potential generated at these electrodes. Thus a voltage is generated across potentiometer 68; a portion of this voltage is connected over line 71 to excite oscillator 70.

The oscillator 70 is preferably a high frequency transistorized oscillator of a well-known type and is shown connected over lead 71 to provide an output at antenna 72 in response to the passage of the vehicle. Thus the whole combination includes a Hall plate, vehicle actuated switch, oscillator and antenna all substantially within the same box embedded in the roadway.

While the magnetic field to actuate the Hall effect generator has been shown as coil 75, other alternatives will be suggested to those skilled in the art. For example if the output of the Hall effect device is amplified, it may be sufficient to utilize the earth's magnetic field such that passage of the vehicle interrupts this field and results in operation (or cessation) of the oscillator. Alternatively the magnetic field may be provided by a permanent magnet which is rotated.

While I have disclosed that the traffic detectors of my invention are disposed within the roadway, it is obvious that there may be many alternative mountings above or alongside which are considered within the scope of this invention. In addition while I have referred to roadway, it is obvious that the invention is applicable to railroad tracks, runways, and more particularly to model railroads. In the latter case it is particularly desirable to have economical switching devices which will not be broken by children. Thus the terms "vehicle," "traffic," and "roadway" are used as inclusive of all such equivalent uses.

In addition while the invention has been described with reference to three junction devices, it is obvious that two junctions or points contact diodes and four junction devices have equal application.

Accordingly, my invention is defined in the following claims.

I claim:
1. Apparatus for detecting passage of a vehicle comprising a semiconductor, a casing including an insulating dielectric, said semiconductor including emitter, collector and base positioned in said dielectric within said casing, means for mounting said casing within a roadway, said dielectric being a pressure-transmitting means for transmitting vibrations from said casing to said semiconductor, means for biasing said emitter in one direction, output means including a reverse biased diode and a terminal connected to said collector whereby vibrations caused by the passage of a vehicle on the roadway are transmitted to said semiconductor to generate a pulse at said output terminal.

2. A vehicle detector comprising a junction type semiconductor having opposite conductivity material joined at a junction, terminal means connected to each material, means for mounting said semiconductor within a roadway with the junction substantially parallel with the roadway surface, pressure-transmitting means interconnecting said semiconductor and said mounting means for transmitting vibrations therebetween, bias means connected to said semiconductor terminals for biasing at least one junction, and output means connected to one of said terminals whereby passage of a vehicle compresses the semiconductor material at the junction to vary the output signal at said output means.

3. A combination as in claim 2, in which said semiconductor includes a PNP junction type transistor having emitter, collector and base, and in which said bias means includes means for forward biasing the emitter-base circuit, and in which said output means includes a resistor and a source of negative potential connected in series to said collector.

4. A combination as in claim 3, in which said output means further includes a diode, an output terminal and means connecting said diode between said collector and said output terminal with reverse bias normally across said diode.

5. A vehicle detector comprising a semiconductor having a base of one type conductivity, a collector electrode connected to said base and an emitter electrode in contact with said base, means for mounting said semiconductor within a roadway, and pressure-transmitting means interconnecting said mounting means and said emitter to vary the position of said emitter relative to said collector on said base in response to the passage of a vehicle on said roadway.

6. A vehicle detector comprising a semiconductor device including a base of one type conductivity and an emitter and a collector of opposite type conductivity, said emitter and base joined at a first junction and said base and collector joined at a second junction, a piezo crystal connected to said base, means for biasing the emitter-base junction, output means connected between the collector and base including reverse bias means for the second junction, means for mounting said semiconductor and said crystal in a roadway, and pressure-transmitting means interconnecting said crystal and said mounting means for transmitting vibrations therebetween.

7. A combination as in claim 6, further including first and second planar conductive plates on opposite surfaces of said crystal, and means for mounting said crystal with one of said plates in ohmic electrical contact with said base.

8. A traffic detector comprising a substantially flat Hall effect semiconductor, a source of direct current, a first pair of connections to opposite ends of said semiconductor, means connecting said direct current source across said first pair of connections to provide a current flow through said semiconductor, a second pair of connections to opposite sides of said semiconductor, output means connected between said second pair of connections to provide an output therefrom, casing means substantially enclosing said semiconductor, said pairs of connections, said connecting means and said output means for mounting in a roadway, a magnetic field source positioned within said casing, a pressure responsive switch to control said magnetic field source, and pressure-transmitting means interconnecting said casing and said switch for transmitting pressure therebetween, whereby said output will vary in response to the pressures of a passing vehicle.

9. The combination as in claim 8, in which said output means includes an oscillator and an antenna energized by said oscillator.

10. A traffic detector comprising a pressure-sensitive semiconductor, means including a mounting casing enclosing said semiconductor for mounting in a roadway, pressure-transmitting means interconnecting said casing and said semiconductor for transmitting to said semiconductor external pressures exerted upon said casing caused by vehicle passage, and an output circuit connected to said semiconductor to produce an output wave functionally related to pressure transmitted to said semiconductor.

11. In combination, a pressure-responsive semiconductor having conduction variable with pressure, bias means connected to said semiconductor for producing a first state of conduction thereof, output means connected to said semiconductor, casing means substantially completely enclosing said semiconductor for mounting adjacent a roadway to be subjected to pressure on passage of a vehicle, said bias means and said output means being within said casing, and pressure-transmitting means interconnecting said casing and semiconductor to transmit pressure to said semiconductor and thereby change the state of conduction of said semiconductor whereby an output signal is generated when pressure is exerted.

12. A detector unit for mounting below the surface of a roadway for detection of pressures caused by vehicle movement on said roadway proximate to said detector, said detector including a casing disposed in said roadway below the surface thereof, a semiconductor within said casing and entirely surrounded thereby, means for conveying from said casing to said semiconductor pressures received by said casing through contact with said roadway, the conductivity of said semiconductor being pressure-sensitive, and means associated with said semiconductor to detect variations in the conductivity of said semiconductor resulting from application of said pressures.

13. A traffic detector for detecting vehicle passage based upon the variation of the earth's magnetic field caused by said passage, including a substantially flat Hall effect semiconductor, a source of direct current, a first pair of connections to opposite ends of said semiconductor, means connecting said direct current source across said first pair of connections to provide a current flow through said semiconductor, a second pair of connections to opposite sides of said semiconductor, output means connected to said second pair of connections, non-magnetic casing means enclosing said semiconductor, said pairs of connections, said connecting means, and said output means for positioning same beneath a roadway, said output means being of sufficient sensitivity to detect variations in potential across said second pair of connections created by the passage of a vehicle above said casing.

14. The combination as in claim 13, including an amplifier connected with said output means to amplify the signal thereof.

No references cited.

NEIL C. READ, *Primary Examiner.*

THOMAS A. HABECKER, *Examiner.*